United States Patent [19]

Zarka

[11] Patent Number: 4,682,810

[45] Date of Patent: Jul. 28, 1987

[54] WHEELED STRETCHER IN WHICH THE PLANE ON WHICH THE PATIENT LIES IS ADAPTABLE IN HEIGHT

[75] Inventor: Michel Zarka, Tours, France

[73] Assignee: Contact Securite - Societe d'Exploitation, Villeneuve La Garenne, France

[21] Appl. No.: 787,907

[22] Filed: Oct. 16, 1985

[30] Foreign Application Priority Data

Oct. 18, 1984 [FR] France ............................... 84 15998

[51] Int. Cl.[4] ............................................... B62H 3/02

[52] U.S. Cl. ....................................... 296/20; 5/82 R; 5/280; 280/640

[58] Field of Search .................. 296/20; 5/62, 63, 81, 5/86, 83, 82 R; 280/640, 641

[56] References Cited

U.S. PATENT DOCUMENTS

| | | | |
|---|---|---|---|
| 3,644,944 | 2/1972 | Bourgraf | 296/20 |
| 3,743,344 | 7/1973 | Jameson | 296/20 |
| 3,826,528 | 7/1974 | East | 296/20 |
| 3,905,054 | 9/1975 | Windsor et al. | 5/81 |
| 4,052,097 | 7/1977 | Weil et al. | 296/20 |

FOREIGN PATENT DOCUMENTS

| | | |
|---|---|---|
| 2544931 | 4/1976 | Fed. Rep. of Germany . |
| 2105938 | 4/1972 | France . |
| 2439583 | 5/1980 | France . |

*Primary Examiner*—Robert R. Song
*Attorney, Agent, or Firm*—Scully, Scott, Murphy & Presser

[57] ABSTRACT

This invention relates to a wheeled stretcher in which the plane on which the patient lies is adaptable in height, comprising a frame on which is fixed a top element and which rests on the ground via a support provided with wheels, wherein each leg of the support is connected to the frame by a connecting rod articulated respectively on the frame and on the leg, said rod being connected to means for adjusting the top element in height and said leg being connected to a means for maintaining and inclining the top element.

15 Claims, 7 Drawing Figures

WHEELED STRETCHER IN WHICH THE PLANE ON WHICH THE PATIENT LIES IS ADAPTABLE IN HEIGHT

BACKGROUND OF THE INVENTION

The present invention relates to a wheeled stretcher in which the plane on which the patient lies is adaptable in height.

Wheeled stretchers are known, which comprise a top element on which the person to be transported is lain and which is mounted on a wheeled support enabling said stretcher to be moved over the ground. However, it is very important to adapt the height of the top element on which the patient lies with respect to another plane on which the stretcher is to be displaced, particularly the floor of an ambulance.

When adapting the height of the top element, difficulties are encountered in obtaining a displacement during which the plane of said top element remains perfectly horizontal.

Furthermore, it is difficult to house the control means on the frame of the top element without hindering folding of the legs of the support.

SUMMARY OF THE INVENTION

According to the present invention, each leg of the support is connected to the frame by a connecting rod articulated respectively on the frame and on the leg, said rod being connected to means for adjusting the top element in height and said leg being connected to a means for maintaining and inclining the top element.

This arrangement according to the invention allows the horizontal elevation of the plane of the top element from one control element only and without hindering the zones reserved for the legs of the support. The device further comprises a means for adjusting the inclination of the top element so as to place the person transported in a determined position.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENTS

Figure 1:
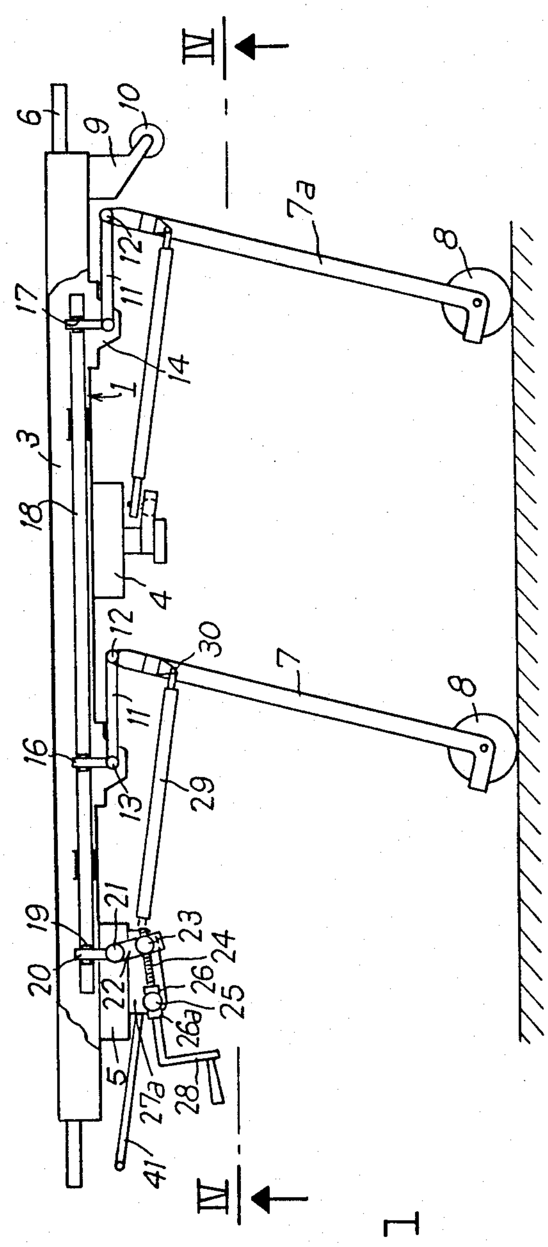
FIG. 1 is a schematic view in elevation and in section along line I—I of FIG. 2 of an embodiment of a wheeled stretcher according to the invention.

Referring now to the drawings, FIGS. 1 to 4 show an embodiment of a wheeled stretcher according to the invention which comprises a frame 1 on which is fixed a top element 2 adapted to receive a recumbent person.

The frame 1 is constituted by two longitudinal elements 3, 3*a* joined together by crosspieces 4, 5 constituted by boxes adapted to receive part of the mechanism. At the ends of the longitudinal elements are provided handles 6 for guiding the stretcher. On the frame 1 are mounted, in articulated manner, two pairs of legs 7, 7*a* connected together by a crosspiece 15, 15*a* and which rest on the ground via wheels 8 allowing the stretcher to be displaced.

At one of the ends of the longitudinal elements 3, 3*a* are provided support members 9 bearing wheels 10 adapted to come into contact with any plane, particularly the floor of an ambulance into which the stretcher is loaded. Each leg 7, 7*a* is connected to the frame 1 by connecting rods 11 articulated connected to a pin 12 on the leg and about a shaft 13 for pivotal movement therewith. Shaft 13 is pivotally mounted in bearings 14 fixed on the longitudinal elements 3, 3*a* of the frame. On the shaft 13 for articulation of each rod 11 on the longitudinal elements there is fixed a fork 16 extending inside the longitudinal elements 3, 3*a* and of which the branches are engaged in two notches 17, 17*a* provided on either side of a transmission bar 18, 18*a* (FIGS. 1, 2) mounted to slide in each longitudinal element 3, 3*a*.

Figure 2:
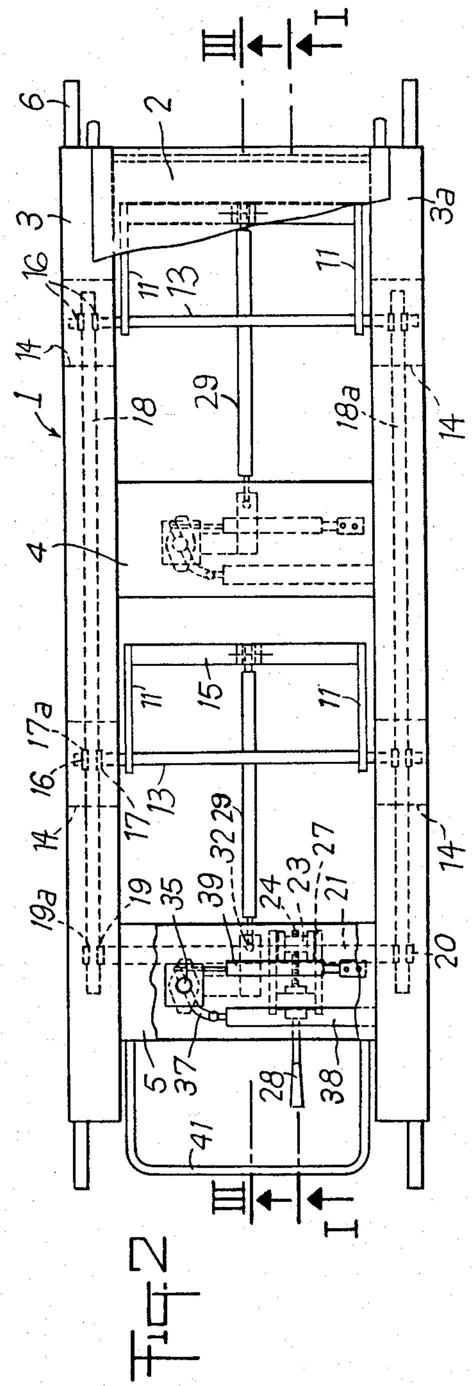
FIG. 2 is a plan view of the wheeled stretcher shown in FIG. 1.
Figure 5:
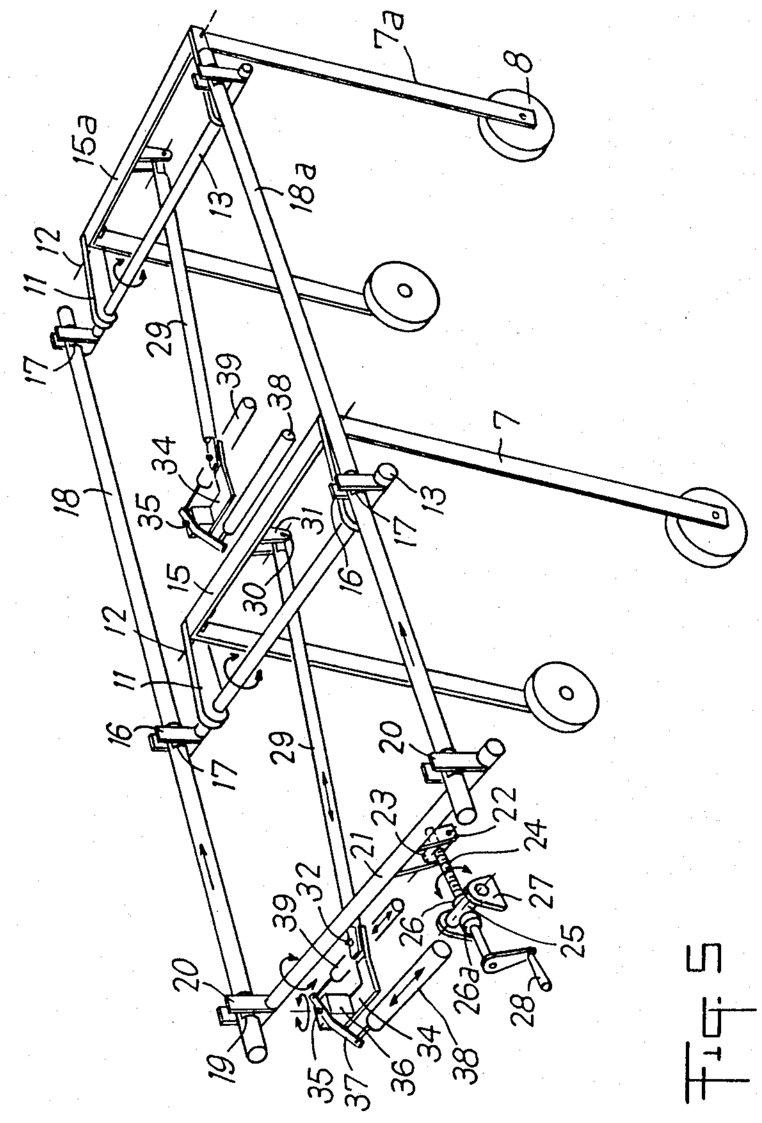
FIG. 5 is a perspective view of the device for controlling the displacement of the top element in height.

At one of their ends, the transmission bars 18, 18*a* each present two notches 19, 19*a* in which are engaged the two branches of a fork 20 fixed to each of the ends of a shaft 21 mounted to rotate in the crosspiece 5 of the frame 1 (FIGS. 1, 2 and 5). On shaft 21 is fixed in its median part a fork joint 22 between the arms of which is pivotally mounted a nut 23 in which is engaged a threaded rod 24 mounted to rotate in a bearing 25 between two stop washers 26, 26*a*, said bearing being mounted in articulated manner between two brackets 27, 27*a* fixed beneath the crosspiece 5.

At its end opposite the nut, the threaded rod 24 is provided with a crank handle 28 for rotating the threaded rod 24 and for acting on the nut 23.

Figure 3:
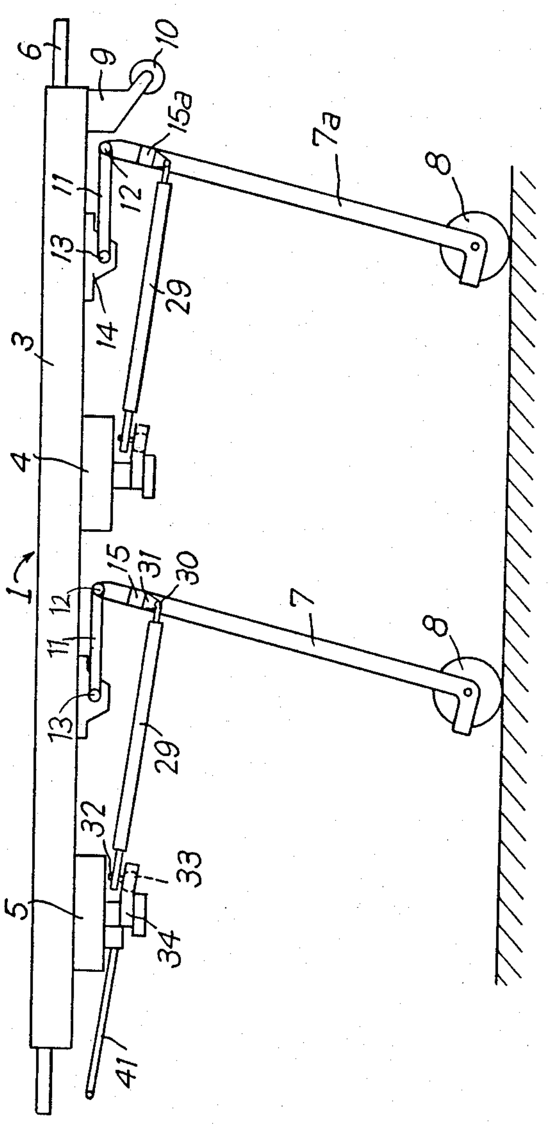
FIG. 3 is a schematic view in elevation and in section along line III—III of FIG. 2 of the wheeled stretcher.
Figure 4:
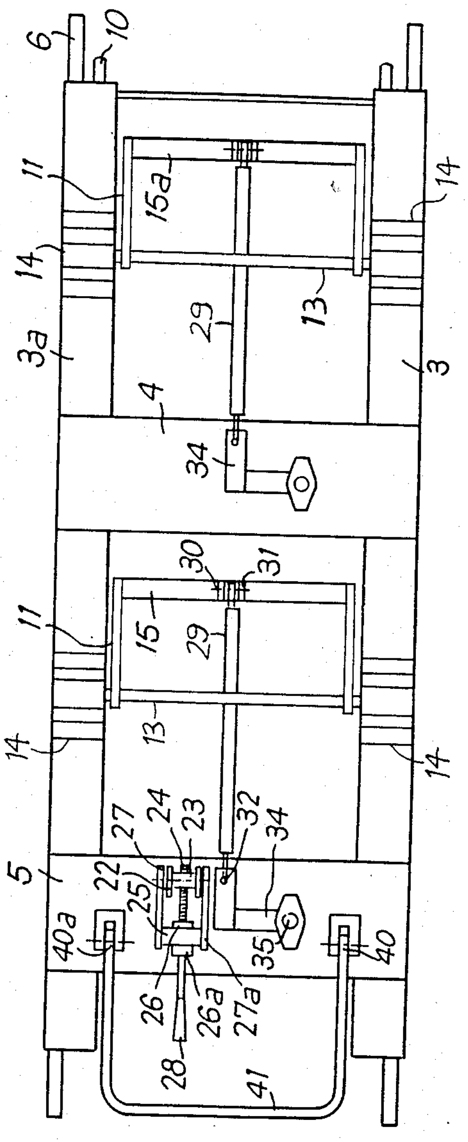
FIG. 4 is a bottom view along line IV—IV of FIG. 1.

To ensure maintenance of legs 7, 7*a* in position and the inclination of the top element, the device comprises a bar 29 which is articulated at one of its ends about a pin 30 mounted in a fork joint 31 fixed on the crosspiece 15 connecting each pair of legs 7, 7*a* (FIGS. 3, 4 and 5).

At its other end, the bar 29 is articulated about a pin 32 fast with a swivel joint 33 mounted in a corresponding housing in one of the arms of a square 34 of which the other arm bears a pin 35 mounted to rotate in a bearing 36 fixed in the crosspiece 4 and 5. The pin 35 rotates with a crossbar 37 of which one of the ends is articulated on the rod of a pneumatic damper 38 employing gas, and of which the other end is articulated on the rod of a damper 39, dampers 38 and 39 being fixed on the crosspiece 5 by an articulation.

One of the dampers 38 is controlled by a means for annulling and re-establishing the elastic effect of the gas in order to displace the piston to modify the inclination of legs 7, 7*a* with respect to the frame and then to ensure maintenance of the legs in position.

On the crosspiece 5 is mounted, in articulated manner, about pins 40, 40*a*, a stop member 41 constituted by a U-shaped bar adapted to come into abutment against the legs when they are folded.

The device according to the invention operates as follows: as the top element on which the patient lies is at a determined height, it may be necessary to bring it to another level particularly to load the stretcher into an ambulance. To that end, the crank handle 28 is actuated in order to rotate the threaded rod 24 (FIG. 5) and to displace the nut 23 longitudinally with respect to the screw.

The nut 23 being articulated in the fork joint 22, it rotates the shaft 21 pivotally mounted in bearings on the crosspiece 5.

Similarly, the forks 20 fast with the shaft 21 are also driven in rotation and act via notches 19, 19*a* on the bars 18, 18*a* which slide longitudinally in the longitudinal elements 3, 3*a*.

Figure 6:
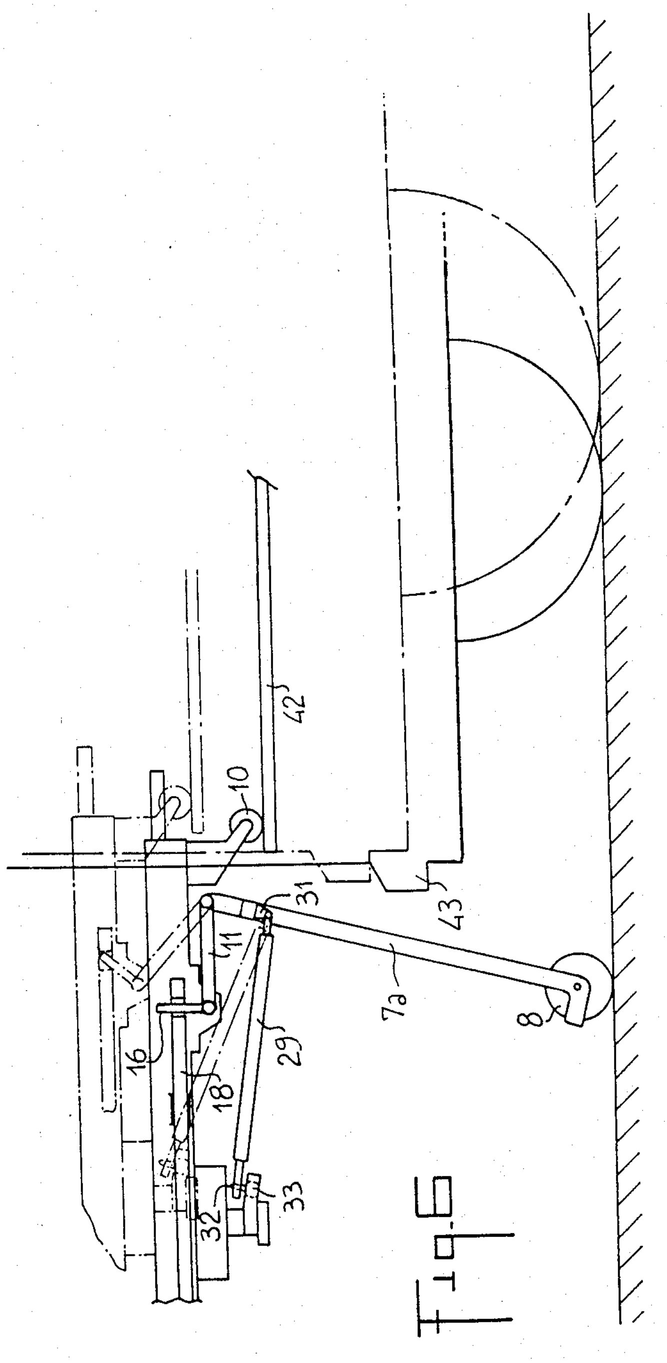
FIG. 6 is a side view of the stretcher showing a frame of the stretcher at two different elevations.

Bars 18, 18*a* presenting notches 17, 17*a* in which are engaged the forks 16 fast with the shafts 13, this results in a conversion of movement ensuring the rotation of the connecting rods 11. As the legs 7, 7*a* are maintained by the bar 29 and the dampers 38, 39, a variation in height is obtained of the top element 2 with respect to the ground on which the wheels rest, as shown in FIG. 6, allowing the wheels 10 to slide onto the floor or tracks 42 of an ambulance 43.

By acting on the adjustable damper 38, particularly by means of push buttons, it is possible to modify the position of the piston which pivots the crossbar and consequently the square 34 which ensures displacement of the bar 29 and of the pair of legs 7 or 7*a* which pivots about pin 12 to incline the top element 2 either forwardly or rearwardly depending on which pair of legs 7 or 7*a* is acted upon.

Figure 7:
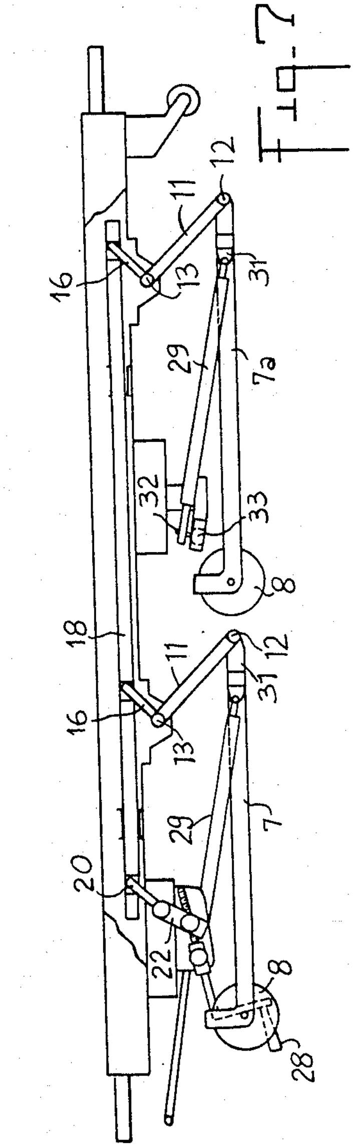
FIG. 7 is a side view of the stretcher showing the legs thereof in a collapsed position.

In an extreme position, the legs 7, 7*a* may be folded completely against the frame 1, as shown in FIG. 7.

The invention is, or course, not limited to the embodiment shown and described in detail, as various modifications may be made thereto without departing from the scope thereof.

What is claimed is:

1. A wheeled stretcher in which the plane on which the patient lies is adjustable in height, comprising a frame on which is fixed a top element and which rests on the ground via two pairs of inclined legs provided with wheels, each pair of legs is connected to the frame by at least a connecting rod and a bar articulated by one of their ends, on the frame and by their other end, on the pair of legs so as to form a deformable quadrilateral, said connecting rod being connected to means for adjusting the top element in height, and said bar being connected to means for controlling the inclination of the legs.

2. A wheeled stretcher according to claim 1, wherein, for each pair of legs:

two lateral connecting rods are fixed to a transversal shaft which is mounted idle in the frame and connected to the means for adjusting the height of the top element, the free end of each connecting rod being articulated on the top of the corresponding leg and a single central bar extends longitudinally and is articulated, by one of its ends, on a downward member of an upper crosspiece connecting the pair of legs, and by its other end, on the means for controlling the inclination of the legs.

3. A wheeled stretcher according to claim 1, wherein the means for adjusting the height of the top element is common to both pairs of legs, and comprises at least a transmission bar extending longitudinally and connected to a device operating in translation, the transmission bar engaging substantially vertical elements fixed to each of the connecting rods.

4. A wheeled stretcher according to claim 2, wherein said means for adjusting the height of the top element comprises two sliding transmission bars guided on the sides of the frame, and each transmission bar having notches in which are respectively engaged two forks fixed to the shafts of the pairs of legs, an a fork fixed to an operating shaft of the translation operating device, said device comprising a threaded rod provided with a crank handle and rotatably mounted but immobilized in translation in a bearing pivoting relatively to the frame, and the threaded rod cooperating with a nut mounted for pivoting in a substantially vertical cap fixed to said operating shaft, the bearing and the nut being rotatably mounted in parallel to said operating shaft.

5. A wheeled stretcher according to claim 1, wherein the means for controlling the inclination of the legs includes a means for controlling the inclination of each pair of legs independent of the inclination of the other pair of legs.

6. A wheeled structure according to claim 2, wherein the means for controlling the inclination of the legs comprises a pivotal element mounted for pivoting movement relative to the frame about a substantially vertical axis and on the free end of which is articulated the corresponding bar, said pivotal element cooperating with at least an adjustable sliding retaining member.

7. A wheeled stretcher according to claim 6, wherein the pivotal element is a square, of which an arm is articulated on the corresponding bar, and of which another arm, is supported in a fixed bearing of the frame for pivoting movement about said vertical axis, each pivotal element being connected with a crossbar, to which ends are connected the sliding retaining member, which is adjusted by a push-button, and a damper.

8. A wheeled stretcher according to claim 1, further comprising a stopbow articulated on the frame about axes and having a retracted position under the plane on which the patient lies, and a lowered stop position for the corresponding pair of legs when the latter is partially inclined.

9. A wheeled stretcher according to claim 3 wherein, said means for adjusting the height of the top element comprises two sliding transmission bars guided on the sides of the frame, and each transmission bar having notches fixed to the shafts of the pairs of legs. and a fork fixed to an operating shaft of the translation operating device, said device comprising a threaded rod provided with a crank handle and rotatably mounted but immobilized in translation in a bearing pivoting relatively to the frame, and the threaded rod cooperating with a nut mounted for pivoting in a substantially vertical cap fixed to said operating shaft, the bearing and the nut being rotatably mounted in parallel to said operating shaft.

10. A wheeled stretcher according to claim 5, wherein the means for controlling the inclination of the legs comprises a pivotal element mounted for pivoting movement relative to the frame about a substantially vertical axis, and on the free end of which is articulated the corresponding bar, said pivoted element cooperating with at least an adjustable sliding retaining member.

11. a stretcher, comprising:

a frame for supporting a person;

front leg means and back leg means;

means connecting each of the front and back leg means to the frame for movement between a collapsed position and a supporting position wherein the leg means extends downward from the frame and supports the frame for movement along a surface, the connecting means including:

(i) a front bar having a first end pivotally connected to the front leg means and a second end pivotally connected to the frame, (ii) a back bar having a first end pivotally connected to the back leg means and a second end pivotally connected to the frame, (iii) a front actuating rod having a first end pivotally connected to the front leg means, and (iv) a back actuating rod having a first end pivotally connected to the back leg means;

leg control means connected to the frame and at the front and back actuating rods to move the front and back actuating rods to move the front and back leg means between the collapsed and supporting positions; and adjusting means connected to the frame and to the front and back bars to pivot the bars relative to the frame and the front and back leg means, to adjust the height of the frame relative to the front and back leg means.

12. a stretcher according to claim 11, wherein:

the front leg means is connected to a first portion of the frame;

the back leg means is connected to a second portion of the frame, and the adjusting means includes to pivot the front and back bars simultaneously to maintain the frame level as the height of the frame is adjusted.

13. a stretcher according to claim 12, wherein the adjusting means includes:

a slide bar supported by the frame for sliding movement therealong;

a front shaft pivotally supported by the frame, and connected to the front bar for pivotal movement therewith;

a back shaft pivotally supported by the frame, and connected to the back bar for pivotal movement therewith;

a front link connected to the front shaft for pivotal movement therewith, and extending from the front shaft to a position adjacent the slide bar;

a back link connected to the back shaft for pivotal movement therewith and extending from the back shaft to a position adjacent the slide bar; and means to slide the slide bar forward and rearward along the frame to engage and pivot the front and back links, wherein the front link pivots the front shaft, and the front shaft pivots the front bar to adjust the height of the first portion of the frame, and the back link pivots the back shaft, and the back shaft pivots the back bar to adjust the height of the second portion of the frame.

14. a stretcher according to claim 11, wherein the leg control means includes:

front leg control means connected to the frame and to the front actuating rod to move the front leg means between the collapsed and supporting positions thereof independent of the back leg means; and back leg control means connected to the frame and to the back actuating rod to move the back leg means between the collapsed and supporting positions thereof independent of the front leg means.

15. a stretcher according to claim 14, wherein: the front leg control means includes (i) a front lever having a first end pivotally connected to the frame and a second end pivotally connected to the front actuator rod, and (ii) means connected to the front lever to pivot the second end thereof to move the front actuating rod and move the front leg means between the collapsed and supporting positions thereof; and the rear leg control means includes (i) a back lever having a first end pivotally connected to the frame and a second end pivotally connected to the back actuator rod, and (ii) means connected to the back lever to pivot the second end thereof to move the back actuating rod and move the back leg means between the collapsed and supporting positions thereof.rting positions thereof.

* * * * *

UNITED STATES PATENT AND TRADEMARK OFFICE

CERTIFICATE OF CORRECTION

PATENT NO. : 4,682,810

DATED : July 28, 1987

INVENTOR(S) : Michel Zarka

It is certified that error appears in the above-identified patent and that said Letters Patent is hereby corrected as shown below:

Column 5, line 24, Claim 12: "includes to pivot" should read as --includes means to pivot--

Signed and Sealed this

Eighth Day of December, 1987

*Attest:*

DONALD J. QUIGG

*Attesting Officer*

*Commissioner of Patents and Trademarks*